2,876,259
PROCESS FOR THE PURIFICATION OF ALKYL-AMINO PROPIONATE SALTS

Robert Nordgren, Minneapolis, Minn., assignor to General Mills, Inc., a corporation of Delaware No Drawing. Application January 23, 1958
Serial No. 710,628

8 Claims. (Cl. 260—534)

This invention relates to a new and useful process for deodorizing and purifying salts of alkylaminopropionates.

Salts of alkylaminopropionates and derivatives thereof are used in dentifrices, shampoos, detergents and related compounds. Obviously, the presence of any odoriferous bodies in compositions of this type greatly detracts from their acceptability. An object of this invention is to disclose an improved process for removing various impurities in this type of salt. A still further advantage to this process, as will be pointed out in detail, is that no additional impurities or odoriferous products are introduced into the salts during the purification process.

Other objects and advantages to this process will become apparent upon reading the subsequent specification.

It has, therefore, been discovered that salts of alkylaminopropionates may be extracted with a mixture of low molecular weight ketones and water without the introduction of impurities into the salts during the purification process. The extraction with these ketones and water removes various impurities that are present in the salts, thus resulting in a more highly purified product than was heretofore possible without employing complicated purification set-ups.

The alkylaminopropionate salts employed in this process are readily available commercial compounds having the general formula

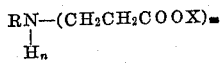

where R is an aliphatic hydrocarbon radical containing 8 to 22 carbon atoms, X is generally an alkali metal salt such as sodium and potassium, $m$ is 1 or 2, and the sum of $m$ and $n$ is 2. These compounds may be prepared by a variety of methods, all of which generally start with a fatty acid amine. Illustrative methods of their preparation are by the addition of methyl acrylate to a fatty amine followed by saponification of the methyl ester or by the addition of acrylonitrile to the fatty amine followed by hydrolysis of the nitrile group to a carboxyl group and saponification of the carboxyl group to the salt.

Low molecular weight ketones suitable for employment in this invention are represented by the general formula

where R′ is an alkyl radical containing less than 5 carbon atoms. Illustrative ketones are acetone, methyl ethyl ketones, methyl propyl ketone, diethyl ketone, methyl isobutyl ketone and the like. However, because of the ease of handling, lower cost, and accessibility, acetone is the preferred ketone to be employed in accordance with the teachings of this invention.

When the above low molecular weight ketones are employed by themselves to extract salts of beta-alkylaminopropionic acid, various condensation products result which are more undesirable than the impurities removed. However, I have found that by the addition of a small amount of water to the ketones during the extraction process these undesirable condensation products are eliminated. It has also been discovered that the addition of an excessive amount of water results in a product that is hard to filter. Thus, in accordance with the preferred teachings of this invention, more than 1% water and less than 10% water by weight should be added to the ketones, the preferred range being from 2.5 to 7.5% of water based on the weight of the ketone. Following the extraction of the salts with the lower molecular weight ketone, the mixture may be separated by filtration or centrifugation.

This invention will be further illustrated by reference to the following examples in which all "parts" are expressed as parts by weight.

Example I

A fatty amine derived from the fatty acids of coconut oil by the route of reacting the acids in the presence of ammonia to form the nitrile and subsequent hydrogenation to the amine was reacted with methyl acrylate. The addition product prepared as above was saponified with sodium hydroxide to yield the corresponding sodium salt and this salt had an appreciable odor. 100 parts of this salt was extracted with 200 parts of acetone by mixing the salt and acetone in a one liter flask for 30 minutes. The salt was then filtered from the acetone and dried at room temperature, whereupon the salt had the odor of mesityl oxide.

Example II

Another sample of the salt prepared as outlined in Example I was extracted in the identical fashion as that shown in Example I except that 10 parts of water were added to the 200 parts of acetone. This resulted in a salt having no appreciable odor.

Example III

A process following the identical procedure of Example II except that 15 parts of water were added to the acetone resulted again in a product with no appreciable odor.

Example IV

Following the procedure of Example II, 20 parts of water were added to the acetone which again resulted in a salt with no appreciable odor. However, the salt swelled slightly which interfered with efficient filtration of the salt.

Example V

Upon the addition of 40 parts of water to the acetone according to the procedure of Example II there resulted a product which because of its swelling could not be filtered.

Example VI

Results obtained by the use of methyl ethyl ketone in experiments similar to those outlined above were substantially the same in regard to the presence or absence of odor in the final salt. However, the handling of methyl ethyl ketone indicated that acetone is preferable in the commercial utilization of this process.

Example VII

The tallow amine diadduct, $RN(CH_2CH_2COONa)_2$ in which R represents the mixed alkyl group of the fatty acids of tallow, was prepared as described in Example I. It was extracted with a 10:200 water-acetone mixture as described in Example II to yield a product having no appreciable odor.

Example VIII

The preceding example was duplicated with the dodecyl diadduct, $RN(CH_2CH_2COONa)_2$ and the results were the same.

Therefore, many modifications and variations of the invention as hereinbefore set forth may be made without departing from the spirit and scope thereof, and therefore only such limitations should be imposed as are indicated in the appended claims.

The present application is a continuation-in-part of my co-pending application Serial No. 584,420 filed May 14, 1956, now abandoned.

Now, therefore, I claim:

1. Process of deodorizing and purifying salts of the formula

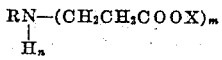

where R is an aliphatic hydrocarbon radical containing 8–22 carbon atoms, X is an alkali metal, $m$ is an integer not larger than 2 and the sum of $m$ and $n$ is 2 which comprises extracting impurities from said salts with a mixture of a low molecular weight ketone and water containing at least 1% and less than 10% water and separating said ketone, water and impurities from said salts.

2. Process of claim 1 in which said separation is by filtration.

3. Process of claim 1 in which said separation is by centrifugation.

4. Process of deodorizing and purifying salts of the formula $RNHCH_2CH_2COOX$ where R is an aliphatic hydrocarbon radical containing 8–22 carbon atoms and X is an alkali metal which comprises extracting impurities from said salts with acetone in admixture with at least 1% water and less than 10% water and separating the acetone, water and impurities from said salts.

5. Process of claim 4 in which said X is sodium.

6. Process of deodorizing and purifying salts of the formula $RN(CH_2CH_2COOX)_2$ where R is an aliphatic hydrocarbon radical containing 8–22 carbon atoms and X is an alkali metal which comprises extracting impurities from said salts with acetone in admixture with at least 1% water and less than 10% water and separating the acetone, water and impurities from said salts.

7. Process of claim 6 in which X is sodium.

8. Process of deodorizing and purifying salts of the formula

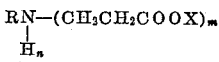

where R is an aliphatic hydrocarbon radical containing 8–22 carbon atoms, X is an alkali metal, $m$ is an integer not larger than 2 and the sum of $m$ and $n$ is 2 which comprises extracting impurities from said salts with acetone in admixture with at least 1% water and less than 10% water and separating the acetone, water and impurities from said salts.

References Cited in the file of this patent

UNITED STATES PATENTS

| | | |
|---|---|---|
| 2,468,012 | Isbell | Apr. 19, 1949 |
| 2,642,459 | White | June 16, 1953 |
| 2,811,549 | Aelony | Oct. 29, 1957 |